Jan. 27, 1959   G. F. DALES   2,871,315
THERMOSTAT AND METHOD OF MAKING
Filed June 20, 1957
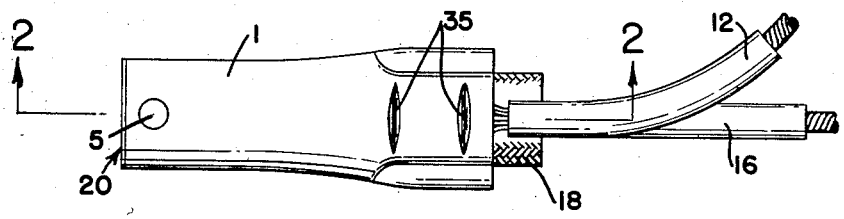
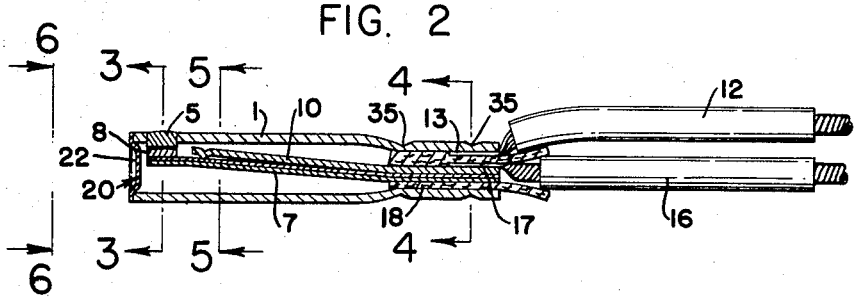
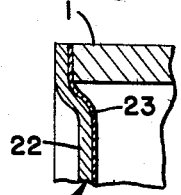
FIG. 7
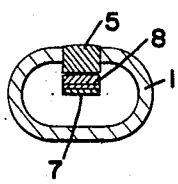
FIG. 3
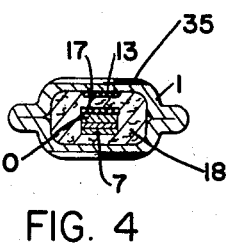
FIG. 4
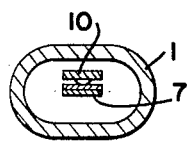
FIG. 5
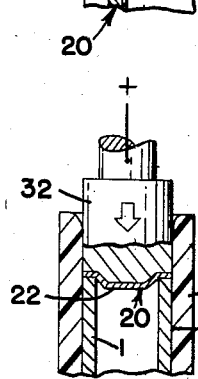
FIG. 8
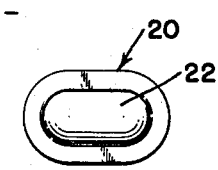
FIG. 6
INVENTOR.
GEORGE FRANKLIN DALES
BY
ATTORNEY

2,871,315

THERMOSTAT AND METHOD OF MAKING

George Franklin Dales, Akron, Ohio

Application June 20, 1957, Serial No. 666,965

10 Claims. (Cl. 200—138)

This invention relates to a thermostat the casing of which is formed of tubing of a metal which conducts electricity, such as copper, steel, brass, Monel metal, etc. The thermostat is small, of the order of an inch or two in length, and the tubing is usually of the order of 1/8 to 3/8 inch in diameter. The thermostat may be located in the coils of a motor and be set to operate if the motor becomes overheated, or it may be incorporated in electrical equipment such as a toaster, or iron, etc. The invention includes the new thermostat and the method of forming it.

In the thermostat of this invention, one end of the casing is closed by a metal cap which is fused to it. If the casing is copper tubing, the cap is preferably steel which is galvanized on the surface which contacts the tubing. When this galvanized surface is welded to the copper, the zinc of the galvanized surface forms an amalgam with the copper. This amalgam forms a tight bond between the cap and the casing.

The electrodes may be fastened within the casing in any convenient manner and in any convenient location, except that they do not penetrate the cap. As illustrating the invention, both electrodes are shown as entering one end of the casing, and there is a metal contact point in the wall of the casing near the cap, but this construction is merely illustrative.

The invention will be further explained in connection with the accompanying drawings, in which—

Fig. 1 is a plan view of the thermostat;

Fig. 2 is a section longitudinally through the thermostat on the line 2—2 of Fig. 1;

Fig. 3 is a cross section through the thermostat on the line 3—3 of Fig. 2;

Fig. 4 is a cross section through the flattened end of the thermostat on the line 4—4 of Fig. 2;

Fig. 5 is a cross section through the thermostat intermediate the ends thereof;

Fig. 6 is an end view of the thermostat;

Fig. 7 is an enlarged detail showing how the cap is welded to the end of the casing; and Fig. 8 illustrates the process of welding the cap on to the casing.

The casing 1 is made of copper tubing. Ordinarily the tubing is circular in cross section, although tubing oval in cross section may be employed.

The contact point 5 is inserted in an opening through the casing. This is composed of silver or other metal suitable for use as a contact point.

Contact is made and broken by the movement of the bimetallic element 7 on the inner end of which is the contact point 8 which is preferably made of silver, although other metal may be employed. As is usual in the manufacture of thermostats, the spring element 10 is provided to assist in breaking the contact.

The electrode 12 is composed of a number of wires which are welded to the plate 13 which is in contact with the casing. If preferred, the wires themselves may make this contact. The wires of the other electrode 16 are welded to plate 17. This plate 17 is inserted in one end of a tube of insulation 18 which may be of woven glass fiber or other suitable insulation material. An end of the bimetallic element and spring 10 are inserted in the other end of this tube of insulation so that the plate 17 lies on the surface of the spring 10 or the bimetallic element if there is no spring.

The plate 20 is welded to the opposite end of the casing. It may be dished (as shown) or perfectly flat. It is formed of a metal which can be welded to the metal of the tubing. The cap of the drawing is formed of a sheet of steel 22 which is galvanized at 23 over its inner surface. The rim of the galvanized surface 23 rests against the end of the casing 1. By heating to about 700 to 800° F. the zinc in the galvanized surface forms an amalgam with the copper of the casing, and this welds the cap securely and permanently to the casing. Other temperatures will be required for welding other metals.

The cap is preferably welded to the casing before the electrodes are inserted. The contact point 5 may be located in the tubing before or after welding the cap in place.

The welding is preferably done by the method illustrated in Fig. 8. The casing 1 is held upright by the jig 30. The cap 20 is placed on the end of the casing. The electrode 32 of a welding machine is then lowered against it, and the relatively higher resistance of the steel, causes it to heat up and melt the zinc which amalgamates with the copper of the casing.

The insulating jacket 18 containing the bimetallic electrode and plate 17 is then inserted in the other end of the casing, with the plate 13 between it and the casing. This end of the casing is then staked at 35 against the insulation, and holds it tight.

The thermostat is calibrated by connecting the electrodes in a circuit with a light or other signal, heating the casing to the temperature at which the electrode is to operate, and then increasing or decreasing the angle between the flattened end of the case and the balance of the casing until the contact between the points 5 and 8 is just broken.

The nature and arrangement of the electrodes within the casing is optional.

What I claim is:

1. A thermostat which comprises a tubular metal casing, two electrodes entering one end of the casing, one electrode being grounded on the casing, means within the casing for making and breaking the flow of current between the other electrode and the casing at a predetermined temperature, and a metal closure plate welded over the other end of the casing.

2. The thermostat of claim 1 in which the tubing and plate are both steel.

3. A thermostat with a tubular copper casing one end of which is closed by a plate having high resistance to the passage of an electric current and having an inner surface coated with zinc, the plate being bonded to the copper casing by an amalgam of the copper and zinc formed by fusion of the zinc with the end of the copper tubing.

4. The thermostat of claim 3 in which the metal of the plate is steel.

5. In the manufacture of a thermostat having a tubular metal casing, the steps of placing a metal plate over one end of the casing, and then passing an electric current through the plate and casing and thereby welding the plate to the casing.

6. The method of claim 5 in which the walls of the tubular casing are supported externally while pressure is applied through the plate to the end of the casing during the welding operation.

7. The method of claim 5 in which the casing and plate are both steel.

8. In the manufacture of a thermostat having a tubular copper casing, the steps of placing a plate of a metal having high resistance to the passage of an electric current and with a galvanized inner surface, over one end of the casing, and then passing an electric current through the plate and casing and thereby causing the zinc to heat and melt because of its high resistance to the passage of the current, with amalgamation of the zinc with the copper, and bonding of the plate to the casing.

9. The process of claim 8 in which the plate is a steel plate and the walls of the casing are supported externally while the plate is pressed against the end of the tubing during the bonding operation.

10. The process of claim 8 in which the metal of the plate is steel.

References Cited in the file of this patent

UNITED STATES PATENTS

| | | |
|---|---|---|
| 2,285,609 | Pedersen | June 9, 1942 |
| 2,327,259 | Gay | Aug. 17, 1943 |
| 2,457,691 | Kubic et al. | Dec. 28, 1948 |
| 2,747,054 | Valverde | May 22, 1956 |
| 2,773,962 | Perst | Dec. 11, 1956 |
| 2,792,474 | Dales | May 14, 1957 |